Nov. 21, 1972     M. W. KUCHENBECKER     3,703,383

FOOD PRODUCT PACKAGE

Filed May 17, 1971     2 Sheets-Sheet 1

INVENTOR
MORRIS WILLIAM KUCHENBECKER
BY
Francis S. Charlton
AGENT

Nov. 21, 1972 M. W. KUCHENBECKER 3,703,383
FOOD PRODUCT PACKAGE

Filed May 17, 1971 2 Sheets-Sheet 2

INVENTOR
MORRIS WILLIAM KUCHENBECKER
BY
Francis S. Charlton
AGENT

United States Patent Office 3,703,383
Patented Nov. 21, 1972

3,703,383
FOOD PRODUCT PACKAGE
Morris William Kuchenbecker, Neenah, Wis., assignor to American Can Company, Greenwich, Conn.
Filed May 17, 1971, Ser. No. 144,086
Int. Cl. B65d 5/00, 81/00
U.S. Cl. 99—171                                    7 Claims

ABSTRACT OF THE DISCLOSURE

A shipping and display package, particularly for fresh fruit, which prevents bruising damage to the packaged product during handling and shipping by subjecting the product to constant, controlled, immobilizing pressure of the package side walls on the product. The pressure is achieved by forcing the medial portions of the side walls inward slightly after filling the package, the inward movement of the wall segments being achieved by the folding of closure flaps over side wall flanges having greater width in their medial portions than adjacent their ends.

BACKGROUND OF THE INVENTION

This invention relates to the packaging of perishable food products and especially to the protective packaging of fresh fruit products which are particularly susceptible to bruising, with resultant high spoilage and severe economic loss, when subjected to the physical shocks and jolts often encountered in shipping the product from its point of origin to the ultimate market place.

In the past, perishable fruits such as fresh grapes, plums and nectarines, particularly, have been shipped from the production area to various sections of the country in bulk shipping cases or lugs which were then distributed to local retail establishments where the cases were opened, any damaged fruit removed and discarded and the remaining undamaged fruit was repackaged in consumer-sized units containing from 1 to 5 pounds of fruit for direct sale to the consumer.

In order to reduce the labor and packaging expense involved in the above procedure, it has been thought desirable to package the fruit directly in consumer-sized units at the point of origin, the fruit to remain in such small-sized package units through all handling and shipping procedures to the point of ultimate consumption.

To be commercially acceptable, however, the consumer-sized packages and the shipping cases containing a suitable plurality (6-24) of such units must protect the fruit from the normal shipping abuse to such an extent that the consumer-sized units will arrive at the retail store for display in an undamaged condition. It is therefore a primary object of this invention to produce a consumer-sized package for perishable food products such as grapes which are readily subject to damage by bruising, which package may be filled with the product at its point of origin and will protect the fruit from damage until it is sold to the ultimate consumer at the retail level.

It has been determined that a principal cause of fruit bruising in conventional consumer-unit sized packages during shipping and handling is movement of the fruit within the package whereby individual portions of the fruit are repeatedly projected into forceful contact with other portions or with the walls of the package. Damage from this source may be eliminated if the fruit is maintained completely immobile within the package during shipping by compressing the package sufficiently after filling it with fruit to maintain the fruit under a constant moderate pressure. It is an object of this invention, therefore, to provide a package which, after being packed with fresh fruit, may be reduced sufficiently in volume to exert a constant, moderate pressure on the package contents to immobilize them during transit and thus eliminate damage from bruising due to product movement within the package.

Furthermore, since it is desirable to cool the fruit as rapidly as possible and maintain its during shipping and handling procedures at suitably low temperatures in order to preserve as long as possible its fresh-picked qualities, the consumer-sized units and the larger shipping cases must be conducive to ready ventilation and circulation of refrigerated air between and through the individual unit packages and cases when maintained in stacked array in refrigerated warehouses or in refrigerated transport vehicles. It is therefore a further object of this invention to provide a package for perishable food products which is conducive to rapid cooling of the packaged product by circulating refrigerated air between and through the packages.

SUMMARY OF THE INVENTION

The above and other objects which will become apparent from the following specification and claims are achieved by the package construction of this invention. A two-piece package is provided including a tray-like cover member having unique, outwardly extending side wall flanges which are wider in their central or medial portions than near their ends, and a bottom wall forming member having extending closure flaps. In folding the closure flaps about the cover side wall flanges, the flanges are forced inwardly of the package and the central areas of the connected side walls are also diverted inwardly by movement of the flanges. This results in a constant, controlled pressure on the package contents, immobilizing the product and preventing bruising during handling and shipping.

DESCRIPTION OF A PREFERRED EMBODIMENT OF THE INVENTION

Figure 1:
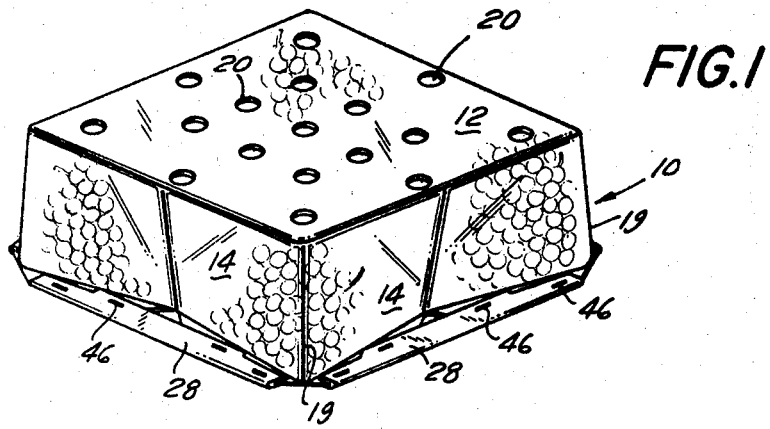
FIG. 1 is a perspective view of the completed package.
Figure 2:
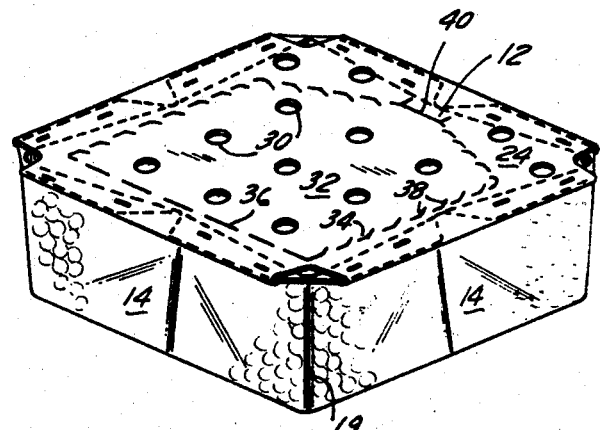
FIG. 2 is a perspective view of the package in an inverted position.
Figure 3:
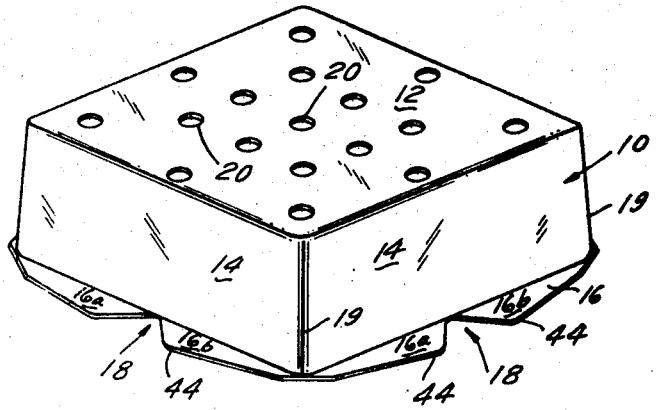
FIG. 3 is a perspective view of the cover member of the package.

The carbon of this invention, as shown in finished form and filled with a fruit product in FIGS. 1 and 2, is formed from two package members, a cover member and a bottom wall member. The cover member, indicated generally by the number 10, is preferably constructed of a semi-rigid, transparent plastic sheet material such as polystyrene, polyethylene, polypropylene, polyvinylchloride or other suitable sheet of 0.015 to 0.030 in. thickness thermoformed as shown in FIG. 3 to comprise a top wall 12 and side walls 14 integrally connected thereto and also to each other. Preferably, the side walls taper slightly outward away from the top wall 12 so that the open side of the tray-like cover member is slightly larger in area than the top wall 12 and the cover members may be packed and shipped in nested relationship to the point of assembly of the finished package. Extending from the lower edge of each side wall in a direction substantially parallel to the top wall is a flange 16, separated into two substantially equal generaly triangular shaped portions 16a and 16b by a V-shaped or U-shaped notch or slot 18 extending from the outer edge of flange 16 inward to the bottom edge of the respective side wall 14 at about its median. The flange portions 16a and 16b have their greatest width adjacent the medially located slot 18 and taper to minimal width adjacent the respective package corners 19. The function of the slot 18 and the tapering flange portions 16a and 16b will be described in detail hereinafter.

The top wall 12 of the cover member is supplied with a number of breather or ventilating holes 20 to allow circulation of air through the package, the size and number of these apertures being chosen to give adequate ventilation without imparting undue structural weakness to the package and without providing for the possibility of loss of the product or undue contamination through the ventilation apertures. For a package which contains about two pounds of grapes, for example, about 10 to 20 apertures of about 3/8 to 5/8 inch in diameter are quite satisfactory, although either the size or number of such apertures may be varied substantially from the above figures.

Figure 4:
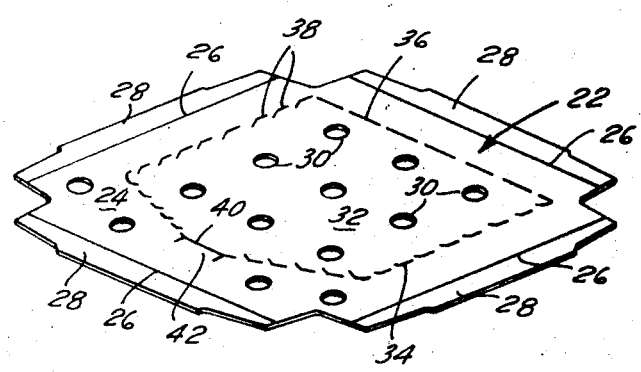
FIG. 4 is a perspective view of the bottom wall forming member of the package.
Figure 7:
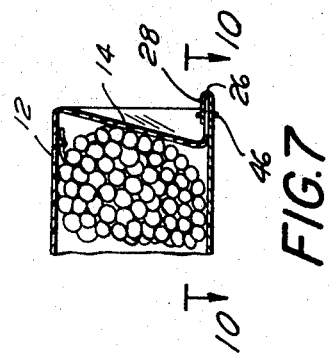
FIGS. 5, 6 and 7 are partial sectional views of the package in progressive stages of the closure thereof.
Figure 5:
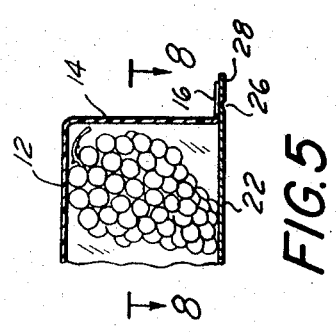

The second package member, generally indicated in FIG. 4 by the numeral 22, comprises the bottom wall of the package of this invention and may be formed of a suitable semi-rigid sheet material such as a polymeric resinous film material or a paperboard suitably coated or impregnated to be substantially water-resistant. A paperboard sheet of between 0.014 and 0.030 in. thickness, heavily wax coated on both sides, has proven quite satisfactory for this purpose, although it is to be understood that heavier or lighter sheets could be utilized and the coating on the paperboard could be any suitable water-repellant material such as polyethylene, for example. Second package member blank 22 is suitably cut and scored to provide a main bottom panel 24 preferably of substantially square shape defined by score lines or similar lines of weakness 26. The main bottom panel is dimensioned to cover the open side of the tray-like cover member 10 of the package and may extend outwardly beyond the side walls to some extent so that the bottom panel partially underlies the cover flange portions 16a and 16b shown particularly in FIGS. 5 and 8. It is essential, however, that the overall width of the main bottom panel 24, as measured by the distance between opposed pairs of score lines 26, be somewhat less than the overall distance between the outer free edges 44 of the opposed pairs of cover member flanges 16, as measured at their widest points. Hingedly connected to main bottom panel 24 along each of the score lines 26 is a closure flap 28 which may be substantially rectangular in shape and of a width equal to that of the cover member flanges 16a and 16b at their narrowest portions, or may be roughly triangular in shape and substantially similar in area and shape to the cover member flanges 16.

The main bottom panel 24 is provided with a plurality of ventilation apertures, 30, similar to the apertures 20 formed in the top wall 12, and an access panel 32 defined by weakness lines 34 and 36. Suitably, weakness line 34 is formed of a series of individual herringbone cut lines 38 or other suitable perforation lines, and weakness line 36 is a score line or an alternating cut and score line which serves as a hinge line for the access panel 32. A U-shaped cut line 40, the base of which connects with weakness line 34, outlines a finger access tab 42 to enable the consumer to grasp the edge of access panel 32 in order to tear the panel open and thus remove the packaged product.

Figure 10:
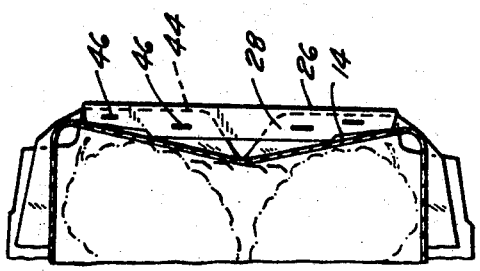
FIGS. 8, 9 and 10 are sectional plan views along lines 8, 9 and 10 of FIGS. 5, 6 and 7, respectively.
Figure 6:
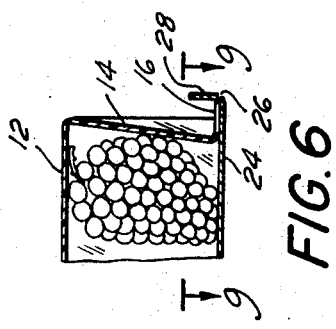
Figure 9:
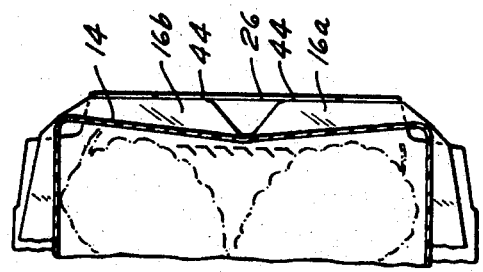
Figure 8:
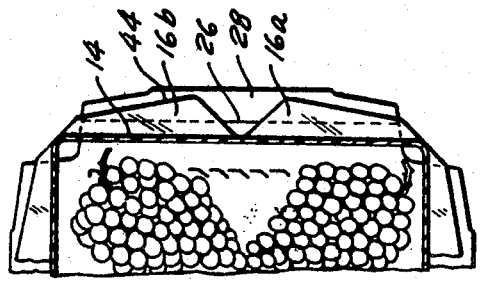

The product is packaged by inverting the cover member so that the top wall 12 is downward with the side walls 14 extending vertically therefrom to form an open tray. Product is introduced and the bottom wall member 22 is placed in position over the product. The package is then re-inverted and the closure flaps 28 are folded upward and inward along hinge score lines 26, as shown progressively in FIGS. 5–7 and FIGS. 8–10, to enclose the cover flanges 16a and 16b between the closure flaps 28 and the main bottom panel 24. During this operation the cover member flanges 16a and 16b are forced to move inward of the package until the free edges 44 of the flanges lie in a substantially straight line along score lines 26 of the bottom forming blank. The side walls 14 become flexed inwardly as a result of the flanges being forced inward, the maximum inward movement of the walls taking place at the point of juncture of the notches 18 with the respective walls. When the closure flaps 28 have been folded through an arc of 180°, as shown in FIGS. 1, 8 and 10, they overlie the portions of the main bottom panel 24 adjacent score lines 26 with the cover portion flanges 16 sandwiched between the bottom panel and the closure flaps. The package may then be secured in this completely assembled condition by a series of staples 46 or equivalent fastening devices passing through the superposed closure flaps 28, cover portion flanges 16 and bottom panel 24.

It is to be particularly noted that the closing and securing of the package by folding the closure flaps 28 over the cover member flanges 16 is accompanied by an inward movement of the medial portion of the side walls of the package, thereby reducing, by a small but significant amount, the overall volume of the completed package, thus exerting a compressive effect on the contents of the package. As a result of the pressure exerted by the container, the contents of the package are effectively immobilized within the package and are thus not subject to bruising caused by movements of the packaged fruit.

The final package, in addition to being tamperproof, has excellent product visibility from all sides except the bottom and is sufficiently rigid to enable stacking for display purposes at the retail level.

In a test shipment, fresh picked grapes packaged in the above-described manner in consumer-sized units of approximately two pounds were shipped in packing cases containing 12 unit packages completely across the United States by commercial carrier without damage, whereas grapes packed in conventional cartons of equivalent size received very substantial damage from bruising in the same shipment.

The reduction in volume of the package resulting from the indentation of the side walls, and hence the degree of pressure exerted on the packaged contents, may be controlled by varying the distance by which the cover member flanges 16, in their widest, medial portions, extend beyond the score lines 26 of the bottom wall member 22 of the package. When the closure flaps are folded upward and inward to sandwich the cover member flanges between the closure flaps and the edge portions of the bottom panel, the outer edges 44 of the flanges will be forced inward of the package by an amount equal to the distance that the flanges normally extend beyond the score lines 26. This in turn controls the amount by which the side walls are pressed in against the package contents and hence the amount of compressive pressure applied to the contents. It has been found that, in a package having a top wall of about 6½ x 6½ inches and a side wall height of about 2½ inches, the desired degree of compression of the two pounds of fresh grapes which the package normally holds is obtained by a flange extension beyond the score lines 26 of between 3/8 inch and 5/8 inch. To give sufficient clearance for the flange portions 16a and 16b as they are forced inwardly by the closure flaps 28, the slot 18 should be at least ¼ inch wide in the area remote from the juncture of the slot with the side wall 14. Obviously, the above values are exemplary of a particular consumer sized unit and must be varied accordingly if larger or smaller unit packages are desired.

Mention has been made of the ventilation apertures 20 and 30 in the cover member and bottom wall member, respectively, of the package. It has been found that, in addition to providing means for the fan-forced circulation of cooling air through the packages when stored in a refrigerated room, these vents also provide for circulation of cooling air and preservative gases such as sulfur dioxide during the shipment of the packages in sealed refrigerated transit units such as trucks or railroad cars. Due to the semi-rigid nature of the package components, a small but significant inward and outward flexing of the top and bottom walls occurs as a result of normal transit jiggling and jolting, providing a bellows-like action which constantly moves air and preservative gas in and out of the package, thus further enhancing the preservation of the fruit in its fresh-picked condition.

It will be obvious to those skilled in the art that various modifications in detail can be made in my invention without departing from the spirit thereof and the description of the particular embodiment set forth herein is to be considered in an illustrative rather than a limiting sense.

I claim:

1. A two-piece package construction for use in the packaging of fresh fruit, comprising:
   a cover member formed from a transparent semi-rigid thermoplastic sheet material molded into a tray-like receptacle open on the bottom face thereof and including a top wall and integrally connected opposed pairs of side walls extending generally vertically therefrom, each of said side walls terminating in an outwardly extending flange in generally parallel relationship to said top wall, said flange on each of at least a first opposed pair of side walls being of greater width in the central area thereof than at the ends thereof, and being divided into substantially equal flange portions by a slot extending inwardly from the free edge of the flange at its widest point to the juncture of the flange with the side wall from which it extends,
   a bottom wall forming member formed of a semi-rigid sheet material and including a main bottom panel of sufficient size to cover the open face of said cover member and having opposed pairs of closure flaps hingedly connected to the side edges thereof along lines of weakness formed in said bottom wall forming member, at least one opposed pair of said lines of weakness being spaced apart by a distance less than that between the outer free edges of the opposed pair of flanges on said first opposed pair of side walls as measured between the points of greatest width of said flanges,
   said closure flaps being adapted to fold along said weakness lines into superposition with the main bottom panel area adjacent its side edges with said cover member flange portions lying between said closure flaps and said bottom panel and with the free edges of said cover member flanges aligned with said weakness lines.

2. A package construction according to claim 1 wherein said main bottom panel and said top wall of said cover member each contains a plurality of ventilation apertures.

3. A package construction according to claim 2 wherein said main bottom panel includes a shaped line of weakness defining an easy access panel.

4. A package construction according to claim 3 wherein said cover member is formed of polyvinylchloride sheet material and said bottom forming member is formed of paperboard bearing a waterproof coating on each surface thereof.

5. A package construction according to claim 4 wherein said cover member side walls taper slightly outwardly from their juncture with said top wall to their juncture with said side wall flanges.

6. A two-piece package construction comprising:
   a cover member formed from a transparent semi-rigid sheet material molded in the shape of a tray-like receptacle open on the bottom face thereof and including a top wall and opposed pairs of integrally connected side walls extending generally vertically therefrom, each of said side walls terminating in an outwardly extending flange in generally parallel relationship to said top wall, said flange on each of at least one opposed pair of side walls being of greater width in the central area thereof than at the ends thereof and being divided into substantially equal flange portions by a slot extending inwardly from the free edge of the flange at its widest point to the juncture of the flange with the side wall from which it extends,
   a bottom wall forming member formed of a semi-rigid sheet material and including a main bottom panel adapted to cover the open face of the cover member and having at least one opposed pair of closure flaps hingedly connected to opposed side edges of said bottom panel along opposed pairs of parallel weakness lines, said closure flaps being adapted to fold into superposition with the main bottom panel area adjacent said weakness lines with said cover member flange portions lying between said closure flaps and said bottom panel, the distance between opposed pairs of weakness lines on said bottom forming member being less than the distance between the free edges of the flanges on said one opposed pair of side walls measured at the point of greatest width of said flanges, whereby said closure flaps, upon folding about said weakness lines to enclose said flanges between said flaps and said bottom panel, are adapted to force the free edges of said flanges into alignment with said weakness lines and cause an inward deformation of the medial portion of said side walls adjacent said slots.

7. A food product enclosed within a two-piece package comprising:
   a cover member formed from a transparent thermoplastic semi-rigid sheet material molded to a tray-like configuration open on the bottom face thereof and including a top wall and opposed pairs of integrally connected side walls extending generally vertically therefrom, each of said side walls terminating in an outwardly extending flange in generally parallel relationship to said top wall, each of said flanges being of greater width in the medial area thereof than at the ends thereof and being divided into substantially equal flange portions by a slot extending from the juncture of the flange with the side wall from which it depends to the free edge of the flange at its widest point,
   a bottom wall forming member formed of a semi-rigid sheet material and including a main bottom panel covering said food product and closing the open face of said cover member, and closure flaps hingedly connected along opposed pairs of weakness lines to the side edges of said main bottom panel,
   said closure flaps being folded inwardly along said weakness lines to lie superposed on the main bottom panel area adjacent said weakness lines with the cover member flange portions lying between said closure flaps and said bottom panel,
   said side walls of said cover member being forced inwardly of said package into compressive pressure with the package contents in the areas adjacent the juncture of the side walls with the widest portion of the flanges, and means fastening the bottom panel, the cover member flanges and the closure flaps together in their areas of mutual superposition.

References Cited

UNITED STATES PATENTS

| | | | |
|---|---|---|---|
| 1,900,897 | 3/1933 | Butterfield | 217—3 FC |
| 1,927,218 | 9/1933 | Rutledge | 217—3 FC |
| 2,562,570 | 7/1951 | O'Brien | 229—23 R |
| 3,153,505 | 10/1964 | Bessett | 206—46 F X |
| 3,521,812 | 7/1970 | Moers et al. | 206—46 F X |
| 3,615,707 | 10/1971 | Filz | 99—171 S |

FOREIGN PATENTS

| | | | |
|---|---|---|---|
| 799,792 | 8/1958 | Great Britain | 229—16 C |

DAVIS T. MOORHEAD, Primary Examiner

U.S. Cl. X.R.

206—46 F; 217—3 FC; 229—16 C

UNITED STATES PATENT OFFICE
CERTIFICATE OF CORRECTION

Patent No. 3,703,383          Dated Nov. 21, 1972

Inventor(s)     MORRIS WILLIAM KUCHENBECKER

It is certified that error appears in the above-identified patent and that said Letters Patent are hereby corrected as shown below:

At the end of the patent, insert Claims 8 and 9, as shown:

--8. A food product enclosed within a two-piece package comprising:

a cover member formed from a transparent thermoplastic semi-rigid sheet material molded to a tray-like configuration open on the bottom face thereof and including a top wall and opposed pairs of integrally connected side walls extending generally vertically therefrom, each of said side walls terminating in an outwardly extending flange in generally parallel relationship to said top wall, each of said flanges being of greater width in the medial area thereof than at the ends thereof and being divided into substantially equal flange portions by a slot extending from the juncture of the flange with the side wall from which it depends to the free edge of the flange at its widest point, a bottom wall forming member formed of a semi-rigid sheet material and including a main bottom panel covering said food product and closing the open face of said cover member, and closure flaps extending from opposed side edges of said bottom panel and operatively connected thereto along opposed pairs of parallel weakness lines, said closure flaps being folded inwardly to bring said cover member flange portions into interlying relationship between the side edge portions of said main bottom panel and said closure flaps, with said side walls of said cover member being forced inwardly of said package into compressive pressure with the package contents in the areas adjacent the juncture of the side walls with the widest portion of the flanges, and means retaining the assembly comprising the bottom panel, the cover member flanges and the closure flaps together in their areas of mutual superposition.

PAGE ONE OF TWO PAGES        (CONTINUED - NEXT PAGE)

CONTINUED FROM PAGE ONE:
UNITED STATES PATENT OFFICE
CERTIFICATE OF CORRECTION

Patent No. 3,703,383   Dated November 21, 1972

Inventor(s) MORRIS WILLIAM KUCHENBECKER

It is certified that error appears in the above-identified patent and that said Letters Patent are hereby corrected as shown below:

9. A two-piece package construction comprising:

a cover member formed from a transparent semi-rigid sheet material molded in the shape of a tray-like receptacle open on the bottom face thereof and including a top wall and opposed pairs of integrally connected side walls extending generally vertically therefrom, each of said side walls terminating in an outwardly extending flange in generally parallel relationship to said top wall, said flange on each of at least one opposed pair of side walls being of greater width in the central area thereof than at the ends thereof and being divided into substantially equal flange portions by a slot extending inwardly from the free edge of the flange at its widest point to the juncture of the flange with the side wall from which it extends, and a bottom wall forming member formed of a semi-rigid sheet material and including a main bottom panel adapted to cover the open face of the cover member, and having at least one opposed pair of closure flaps extending from opposed side edges of said main bottom panel and operatively connected thereto along a pair of parallel weakness lines delineating the said opposed side edges of said main bottom panel, the distance between said pair of weakness lines on said bottom-forming member being less than the distance between the free edges of the flanges on said one opposed pair of cover side walls measured at the point of greatest width of said flanges, said closure flap extensions being adapted, upon folding about said weakness lines, to force the free edges of said flanges into alignment with said weakness lines, causing an inward deformation of the medial portion of said cover side walls adjacent said slots, folding of said closure flap extensions being further adapted to bring said flanges into interlying relationship between the side edge portions of said main bottom panel and said closure flaps.--

PAGE TWO OF TWO PAGES

Signed and sealed this 27th day of March 1973.

(SEAL)
Attest:

EDWARD M. FLETCHER, JR.
Attesting Officer

ROBERT GOTTSCHALK
Commissioner of Patents